United States Patent [19]

Reber

[11] Patent Number: 4,951,704
[45] Date of Patent: Aug. 28, 1990

[54] CONCEALED RELIEF SYSTEMS FOR CLOSED SYSTEM FIRE TANK TRUCKS

[76] Inventor: Larry F. Reber, 5963 Fountain Noon Rd., Apple Creek, Ohio 44606

[21] Appl. No.: 397,045

[22] Filed: Aug. 22, 1989

[51] Int. Cl.⁵ .............................................. F16K 51/00
[52] U.S. Cl. .................................. 137/351; 137/574; 137/587; 137/590
[58] Field of Search ............... 137/574, 590, 351, 587; 280/3, 839

[56] References Cited

U.S. PATENT DOCUMENTS

| | | | |
|---|---|---|---|
| 2,664,911 | 1/1954 | Thompson et al. | 137/574 |
| 2,757,686 | 8/1956 | Maxwell | 137/574 |
| 3,633,609 | 1/1972 | Benner et al. | 137/351 |
| 3,903,924 | 9/1975 | Readman | 137/574 |
| 4,474,189 | 10/1984 | Brown | 137/351 |

Primary Examiner—A. Michael Chambers
Attorney, Agent, or Firm—Oldham & Oldham Co.

[57] ABSTRACT

A concealed vent system is disclosed for closed system fire tank trucks, which permits the tank truck to be adequately vented while being filled completely by an auxilliary source of water. The vent system is a sloped conduit that originates in the clean out hatch atop the tank and terminates in a valving means external to the tank and rearward of the rearmost wheels of the tank truck, such that water vented does not pose a safety hazard to fire fighters.

9 Claims, 1 Drawing Sheet

CONCEALED RELIEF SYSTEMS FOR CLOSED SYSTEM FIRE TANK TRUCKS

This invention relates to an concealed relief vent system for installation in closed system truck-mounted tanks. More particularly, this invention relates to the installation of a concealed vent system designed to permit a closed or sealed truck mounted tank to be adequately vented so as to allow it to be loaded from an auxilliary source. While accomplishing this it allows the tank to be completely filled with liquid, thereby maximizing the delivery rate of liquid in the tank, and minimizing inertial forces of the liquid contained in the tank, which is produced by abrupt movement of the vehicle on which such tank is mounted. This invention also allows the vent to be concealed and the discharge to be directed away from the wheels of the truck.

BACKGROUND OF THE INVENTION

Trucks, and particularly tanker trucks, are widely used for transporting a multitude of different liquids. One very specific use of tanker trucks is to deliver water to fires in rural areas where water supply from hydrants is not available. Fire tanker trucks used for carrying water commonly do so by taking on a load from an auxillary source, as described below, rushing to the scene of the fire, rapidly unloading the water supply into a temporary structure, and returning thereafter for additional water. In fire service, this is referred to as a "water shuttle". It may involve one or more auxilliary water source, including pumpers, pumper/tankers, pond pumpers, or pressure hydrants. Such sources load tankers of many different types, which tankers transport the water to the fire scene.

A vacuum fire tanker is equipped to load itself rapidly and efficiently without the use of an auxilliary source. But it is often advantageous, and occasionally even mandatory, that a vacuum fire tanker be used in a water shuttle involving an auxilliary source. When this is the case, the vacuum fire tanker's closed tank system must have a safe, controlled venting capability. It is an object of this invention to provide both safety and control.

Because of the rural locale, the truck is operated at high speeds, frequently on uneven terrain and, not uncommonly, with frequent, sudden braking. Since the ability to fight the fire is often directly related to the number of gallons of water per minute that can be delivered to the fire scene, the efficiency of rural fire fighting can be increased by increasing either the capacity of the truck to hold water, the ability of the truck to operate safely at higher velocities, or both. It is the object of this invention to increase both factors.

One solution for this problem has been proposed in my U.S. Pat. No. 4,789,170. In that patent, I disclose a system for inserting baffles in such tanker trucks to subdivide the inertial forces generated by the load shift in a liquid load, thereby attenuating such forces. The present invention may be used either with or without such baffles.

DISCLOSURES OF THE INVENTION

In view of the foregoing, therefore, it is a first aspect of the invention to provide a method for adequately venting a sealed or closed tank, such as, but not limited to, a vacuum tank, when being filled by an auxilliary source such as, but not limited to, a pumper, pumper/tanker, pond pumper or pressure hydrant.

A second aspect of the invention is to provide a method for completely filling a closed system tank truck.

A third aspect of the invention is to make the operation of emergency fire tank trucks safer by providing a method to completely fill them from an auxilliary source, thereby attenuating the inertial forces due to a shifting liquid load.

A fourth aspect of the invention is to provide an overfill relief means for tank trucks that disposes of any overflow liquid at a point below the tank and rearward of the rearmost wheels, thereby minimizing the hazards associated with spilling of liquids across the upper tank surfaces, as may be encountered during freezing conditions.

The foregoing and other aspects of the invention are achieved in a vehicle mounted tank for transporting liquids which contains an internal conduit, said internal conduit having first and second ends, said first end originating at a point internal to the tank and substantially perpendicular to the tank surface, but at, or preferably slightly higher than, the top elevation of the tank, said conduit then sloping downward in the tank at an angle of at least about 45° with the bottom of the tank, said conduit exiting the tank substantially perpendicular to the tank surface and preferably behind the rearmost wheels of the tank truck, said second end of the conduit being closed by a valve external to the tank and operable either manually or automatically, said conduit also being sized large enough to minimize pressure drop from said first end to said second end, but small enough to minimize the unfilled volume of said tank.

BRIEF DESCRIPTION OF THE DRAWINGS

The invention will be better understood when reference is had to the following drawings, in which like numbers refer to like parts, and wherein.

BEST MODE FOR CARRYING OUT THE INVENTION

Figure 1:
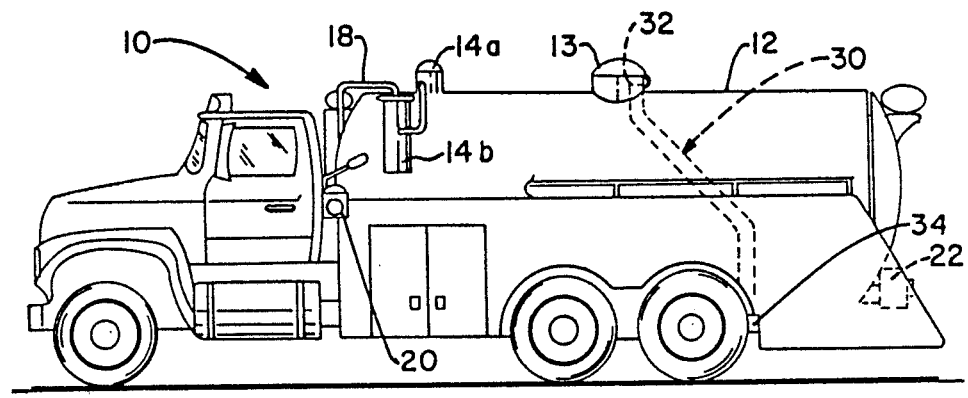
FIG. 1 is a side view of a vacuum type fire tanker truck, wherein the concealed relief vent system is shown disposed internally to the tank by phantom lines.

FIG. 1 is a side view of a fire tanker truck, indicated generally by the numeral 10, and having a water tank 12 and various accessories discussed further below disposed thereon. The tank 12 is equipped with a clean out hatch 13. Tank 12 may be loaded, for example, by attaching a hose, not shown in the figure, to fill valve 20, discharge valve 22, or both. The second end of each hose is placed in a convenient source of water, for example, a pond.

When being used as a vacuum system, by removing air from the closed and sealed tank, a vacuum is drawn on tank 12 with a vacuum pump, not shown but housesd in an enclosure 19, which pump is connected to tank 12 through vacuum line 18. Safety check valves 14a and 14b, respectively, protect the vacuum pump by preventing water from being drawn therein and thereby damaging it during filling operations.

When an auxilliary source is used for filling tank 12, the vacuum system is not used. However, air must be exhausted from the closed tank 12 as it is replaced by water. Likewise, water must be vented in the event of overfilling. Failure to provide this venting will cause pressure to build up, with potential harm to equipment and personnel. Pressure buildup can also slow the filling rate, which is crucial to the operation. The concealed relief vent system of this invention is a method of providing such pressure relief.

Water is typically added to tanks such as tank 12 at rates of 1,000 gallon per minute or more. A vent system must be able to accommodate such a fill rate to be effective.

Typically the tank portion of such tanker trucks is cylindrical in nature, with a length to diameter ratio in the range of about 2 to about 6, and also typically having outwardly dished heads on one or both ends thereof. Since the cylindrical tank is typically situated with its longitudinal aspect essentially parallel to the ground, the rate of increase of depth in the water or liquid being added to the tank, is non-lineal with respect to the rate of addition of such liquid, and particularly so as the tank is nearly full. It is extremely undesirable to overflow the tank out of the top clean out hatch 13, especially in the winter when the overflowing liquid may freeze and make operations around the tank extremely hazardous. Therefore, it is common practice to greatly slow the fill rate when the tank is about 75% filled and to shut off the water supply to the tank before the tank is more than 90–95% filled, thereby avoiding the point of most rapid lineal increase in depth. If, however, the clean out hatch 13 has a conduit, generally indicated as 30, installed inside it and substantially perpendicular to the top level of the tank, with the uppermost edge 32 of the conduit being slightly higher, at least an inch or two above, the upper edge of the tank, then the uppermost edge 32 of the conduit acts as an overflow weir and permits the tank to be filled completely without overflow from the clean out hatch.

The critical features of the overfill relief system disclosed in FIG. 1 are the locations of the upper or first end 32 of the overfill relief system 30 and the lower or second end 34 of the overfill relief system 30, and the slope of the portion of pipe or conduit connecting the first and second ends of the overfill relief system 30. Another critical feature is the valving means 31, used at the second end of the overfill relief system to isolate the tank interior from the environment, permitting a vacuum to be drawn during vacuum operation.

Although it would be possible to have the conduit 30 extend directly down and out the bottom side of the tank, such a solution is generally not preferred, as the discharge point 34 at the bottom of the tank would be forward of the rear tires of the tank causing dangerous mud, ice, or unnecessary wetting of the truck's rear brakes. In order to direct the overflow discharge point to a location behind the rearmost wheels of the tanker, a straight section of conduit 36 can be connected by elbow joints 38a and 38b to the first and second ends of the conduit, which are located perpendicular to the bottom side of the tank. The preferable angle of such conduit with relation to the bottom side of the tank is at least about 45°, and either 45° or 60° is preferred because of the ready commercial availability of elbow joints of such angularity.

Figure 2:
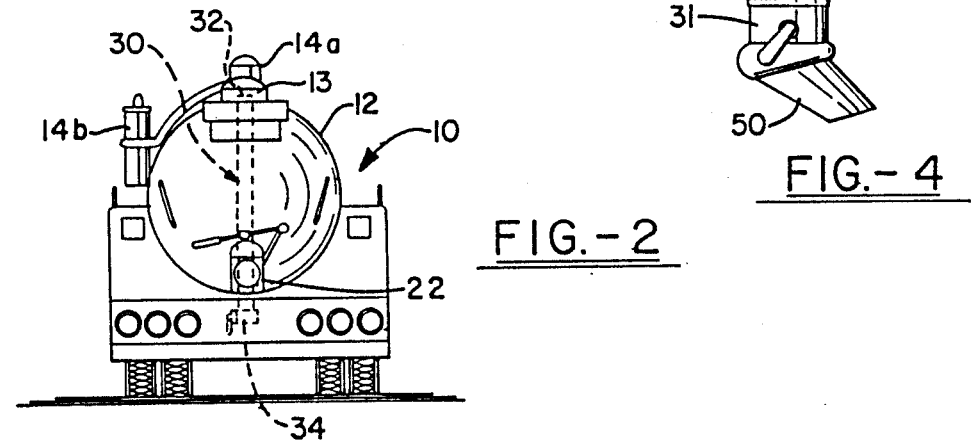
FIG. 2 is a rear end view of the fire tanker truck of FIG. 1, wherein the concealed relief vent system is shown disposed internally to the tank by phantom lines.

FIG. 2 shows a rear end view of the fire tanker truck 10 of FIG. 1, showing details of the truck, including the tank 12, which may be filled or emptied through discharge valve 22. Safety check valves 14a and 14b are also shown. The internal location of the overfill relief system 30 of this invention is shown generally. Although it is preferable to place the overfill relief system as closely to the longitudinal axis of the tank 12, as illustrated in FIG. 2, it is obvious that slight deviation therefrom is not detrimental to efficacious use.

Figure 3:
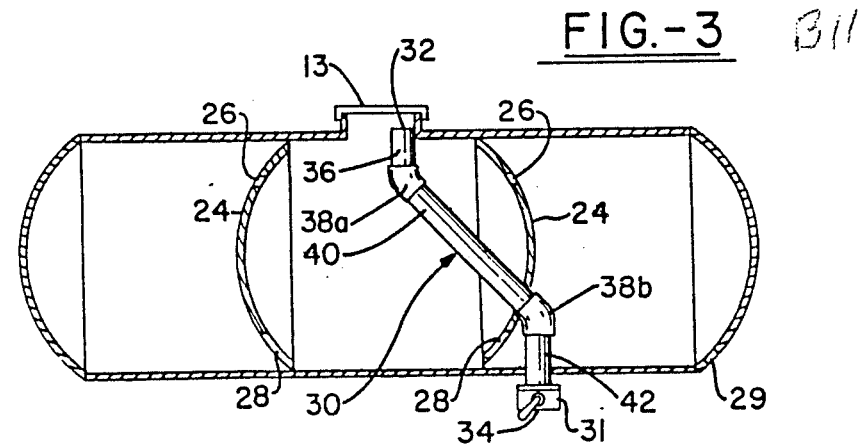
FIG. 3 is a cross-section of the tank portion of the fire tanker truck of FIG. 2 along its longitudinal axis, showing the features of the concealed relief vent system.

FIG. 3 shows a cross section of a tank 12 along its longitudinal axis, illustrating the internal placement of the overfill relief system 30 of this invention. In the figure, tank 12 is shown with the clean out hatch 13 and fitted with an external port 29, of which there may be several for loading and/or unloading purposes.

Tank 12 is fitted with two substantially spherical, dish-shaped, internal baffles 24, of the type disclosed in U.S. Pat. No. 4,789,170, but such baffles are not required for the invention. The baffles 24 are fitted with equalizer ports 26 for the purpose of equalizing pressure in the tank on both sides of the baffles and compartment access doors 28 which allow liquids to be moved from area to area within the tank. Flow of water in and out of the tank is achieved through portals in the tank, one of which is shown as 29 in FIG. 3.

The overfill relief conduit 30 described generally in the above description of FIG. 1 is shown more fully in FIG. 3. The conduit 30 comprises a short piece of pipe or conduit 36 with its upper end located in or near the clean out hatch 13 and its upper end 32 also serving as an overflow weir. The lower end of pipe 36 is affixed to the first end of an elbow joint 38a, preferably a 45° or 60° elbow joint, the second end of which elbow joint is affixed to a longer section of pipe 40, the second end of which is affixed to the first end of a second elbow joint 38b. Elbow joint 38b is also an elbow joint of at least 45° angularity, and preferably either 45° or 60°, because of ready commercial availability of such elbow joints. Affixed to the second end of the second elbow joint 38b is a second short piece of pipe 42, so that pipe 42 exits the tank 12 substantially perpendicular to the side thereof. The lower end 34 of pipe section 42 is closed with a valving means 31, preferably a butterfly valve, but the exact choice of valve type and size will be easily determined by one of ordinary skill in this art. Such a valve 31 can be selected so as to be manually or automatically operated, and remote operation at either the rear or the cab of the tanker truck is preferred. This valve 31 serves to function as a means of sealing the tank during vacuum operations.

It is important to maintain as much access to the tank as possible through the clean out hatch 13. For that reason, it is desirable to have the overflow weir 32 essentially perpendicular to the top of the clean out hatch and it is also desirable to keep the diameter of the conduit as small as possible. Since pressure drop through the conduit varies inversely with the diameter of the conduit, it is desirable to keep the conduit larger than a certain minimum size of about 2 or so inches. Because the volume occupied by the conduit represents unfilled capacity of the tank, it is desirable to keep the diameter of the conduit under a certain maximum size of about 4 or so inches. These sizes are typical for a tank in fire service, where a tank diameter will vary from about 54" to 84" and the clean out hatch will be about 18" in diameter.

Figure 4:
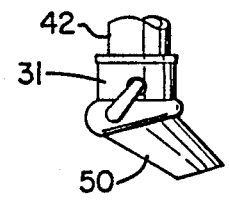
FIG. 4 is a side view of an alternative embodiment of the present invention, wherein a flared portion of pipe is attached to the discharge side of the butterfly valve to further direct the flow of liquid.

As shown in FIG. 4, another preferred element of the present invention is a short section of flared pipe 50, which is preferably rotatably attached by conventional means to the external or discharge side of valving means 31, allowing final direction of overflow discharge away from pertinent components of truck 10.

While in accordance with patent statutes, a preferred embodiment and best mode have been presented, the scope of the invention is not limited thereto, but rather is measured by the scope of the attached claims.

What is claimed is:

1. An overfill relief system for a tanker truck having a tank of cylindrical cross-section mounted thereon and positioned such that said tank's longitudinal axis is parallel to the truck's direction of locomotion, said overfill relief system comprising, 'a continuous unobstructed conduit having a fist end and a second end;

said first end positioned at least as high as the top surface of said tank and substantially perpendicular thereto and being open;

said second end positioned rearward of the rearmost wheels of said truck and exiting said tank in a substantially perpendicular manner;

said second end having a valve means; and said first and second ends of conduit being connected by a sloping section of conduit disposed at an angle of at least about 45° with the longitudinal axis of the tank.

2. The overfill relief system of claim 1 wherein the conduit is formed of rigid cylindrical material.

3. The overfill relief system of claim 1 wherein the valve means is a butterfly valve, operational butterfly valve.

4. The overfill relief system of claim 1 wherein the sloping section of conduit comprises a rigid section of pipe and two elbow joints of equal angularity;

said first and second elbow joints being affixed to the first and second ends of said section of pipe.

5. The overfill relief system of claim 4 wherein the angularity of said elbow joints is at least 45°.

6. The overfill relief system of claim 5 wherein the angularity of said elbow joints if 45°.

7. The overfill relief system of claim 5 wherein the angularity of said elbow joints if 60°.

8. The overfill relief system of claim 1 wherein said second end terminates in a short section of flared pipe to further direct overflow discharge away from critical truck components.

9. The overfill relief system of claim 1 wherein the valve means is a butterfly valve, remotely operated by automated means.

* * * * *